July 10, 1928.
J. A. ULMER
1,676,368
IGNITION DEVICE FOR SMUDGE POTS
Filed Jan. 5, 1926   2 Sheets-Sheet 1
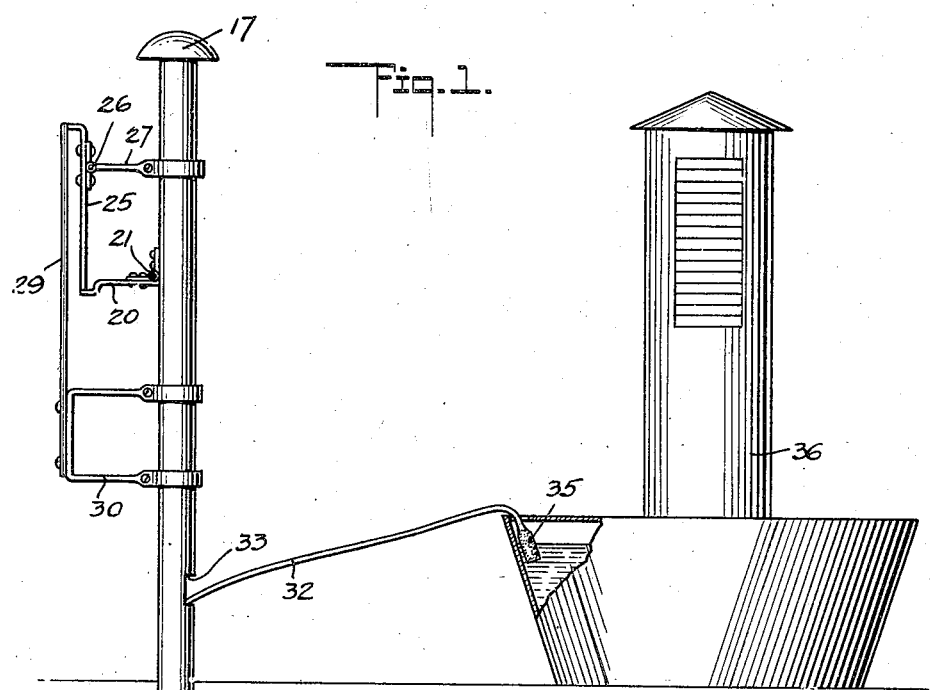
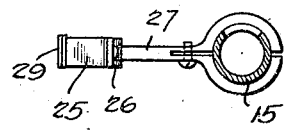
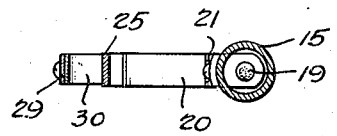
Inventor
JOSEPH A. ULMER
By Munn & Co.
Attorney July 10, 1928.
J. A. ULMER
1,676,368
IGNITION DEVICE FOR SMUDGE POTS
Filed Jan. 5, 1926   2 Sheets-Sheet 2
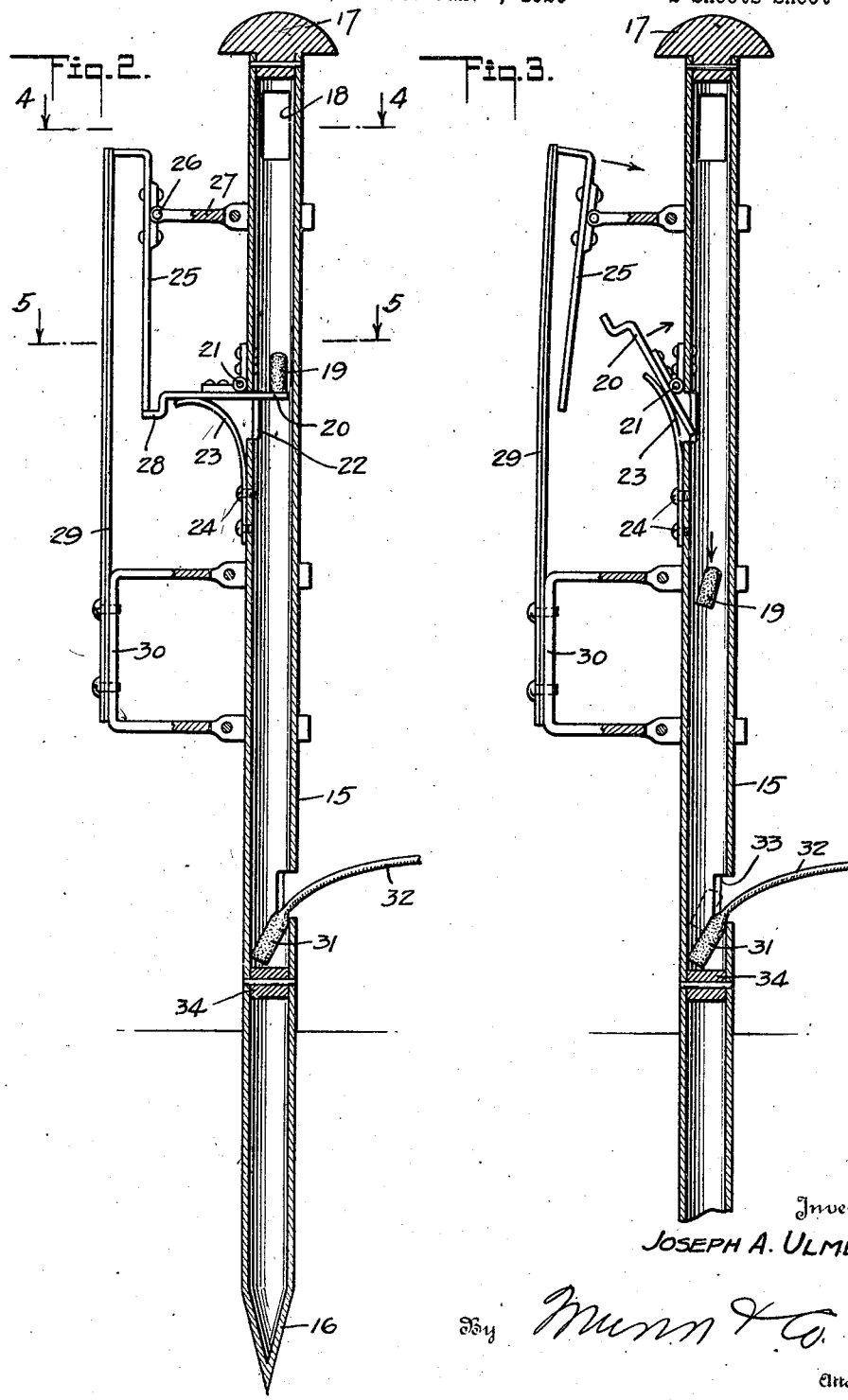
Inventor
JOSEPH A. ULMER
By Munn & Co.
Attorney Patented July 10, 1928.

1,676,368

UNITED STATES PATENT OFFICE.

JOSEPH AMES ULMER, OF LOS ANGELES, CALIFORNIA.

IGNITION DEVICE FOR SMUDGE POTS.

Application filed January 5, 1926. Serial No. 79,380.

My invention relates generally to ignition devices, and particularly, although not necessarily, to devices for igniting smudge pots as used in citrus groves.

It is a purpose of my invention to provide an ignition device which is normally inactive but which upon the atmospheric temperature surrounding a smudge pot dropping to a predetermined low degree such as would be injurious to the fruit in the citrus grove, becomes active to ignite the smudge pot and thus raise the temperature of the atmosphere sufficiently to prevent injury to the fruit. Aside from setting and loading the device following an ignition operation, my invention is entirely automatic so as to eliminate the human element as far as possible and its attendant expense, and to thus render the ignition operation positive and in due time to prevent injury to the fruit.

I will describe only one form of ignition device embodying my invention and will then point out the novel features thereof in claims.

In the accompanying drawings,

Figure 1 is a view showing in side elevation one form of ignition device embodying my invention applied to a smudge pot;

Figures 2 and 3 are views showing in vertical section the ignition device shown in Figure 1 and the inactive and active positions, respectively, thereof;

Figures 4 and 5 are horizontal sectional views taken on the lines 4—4 and 5—5, respectively, of Figure 2.

Similar reference characters refer to similar parts in each of the views.

Referring specifically to the drawings, my invention, in its present embodiment, comprises a tubular stake 15 closed and pointed at its lower end as indicated at 16 and closed at its upper end by means of a head 17, the head being secured within the tube and of suitable form to permit hammering thereof in driving the pointed end of the stake into the earth. Adjacent the head 17 the stake 15 is provided with a loading opening 18 through which a pellet 19 formed of an ignitable substance may be introduced into the stake and onto a platform 20. By means of a hinge 21, the platform 20 is pivotally supported on the stake to occupy a horizontal or pellet-supporting position within an opening 22 of the stake, and it will be understood that in this position of the platform it bridges the stake interiorly so as to intercept the pellet 19 in its downward movement and thus support the latter, as clearly illustrated in Figure 2. The platform 20 is releasably retained in pellet-supporting position against the action of a spring 23 secured to the stake as indicated at 24, and by means of a latch 25 pivoted at the point indicated at 26 on a bracket 27 suitably secured to the stake 15. This latch 25 is L-shaped in form with the lower end of its long arm engaging an L-shaped extension 28 on the outer end of the platform 20, and with the latch in this position it will be clear that the platform is retained in horizontal position against the action of the spring 23. The latch 25, in turn, is retained in latching position by means of a thermostat 29, conventional in form and secured at its lower end to a bracket 30 with the latter, in turn, secured to the stake 15. The upper end of the thermostat 29 engages the short arm of the latch 25, and in the normal or unflexed position of the thermostat the latch is securely held in latching position with respect to the platform 20. However, when the thermostat is subjected to a temperature of a predetermined low degree, it automatically flexes to the right as shown in Figure 3, whereby the latch 25 is swung to released position with respect to the platform 20 so as to allow the spring 23 to move the platform to pellet-discharging position as clearly shown in Figure 3. With the platform in this position, the pellet 19 is discharged downwardly within the stake 15 and into physical contact with a similar pellet 31 on the end of a fuse 32. As shown in Figures 2 and 3, the fuse 32 is extended through an opening 33 of the stake 15, so that the pellet 31 is supported on a plug 34 secured within the stake. The other end of the fuse 32, as shown in Figure 1, is provided with a pellet 35 which is partly immersed in the oil of any conventional smudge pot 36.

In the present embodiment of my invention, the ignitable substances of which the pellets 19 and 31 are formed are such that they become ignited when brought into physical contact with each other. For example the pellet 19 may be made of chlorate of potash, sugar, and paper pulp, and the pellet 31 of paper pulp saturated with sulphuric acid. Thus it will be seen that when the pellet drops into contact with the pellet 31 the corresponding end of the fuse 32 will be ignited, thus causing the fuse to burn until it reaches the pellet 35, when it ignites the latter. The pellet 35 is slow burning, so as to insure the ignition of the fuel contained in the smudge pot.

In practice, the ignition device is designed so that when the atmosphere surrounding the smudge pot reaches a predetermined low temperature, the thermostat 29 moves the latch 25 to released position to permit discharging of the pellet 19 from the platform 20,—and from the foregoing description it will be manifest that the fuse 32 is thus ignited to effect ignition of the fuel in the smudge pot. Obviously, the device can be used indefinitely, it being only necessary, following each ignition operation, to re-set and re-load the device in order that it may effect the automatic igniting of a smudge pot when the temperature of the surrounding atmosphere falls to a predetermined degree. It will be understood that the operation of the thermostat 29 is such that it actuates the latch 25 when the temperature of the atmosphere reaches a degree approaching a temperature which would be injurious to citrus fruit, so that the positive ignition of a smudge pot is effected in time to raise the temperature of the surrounding atmosphere and thus prevent injury to the fruit.

An important feature of my invention is that the ignition device can be employed to ignite one or more smudge pots by the employment of one or more fuses of a length sufficient to permit the distant positioning of the device with respect to the smudge pots so as to prevent injury to the device by the burning smudge pots and thus retain the device intact to permit of its use indefinitely.

Although I have herein shown and described only one form of ignition device for smudge pots embodying my invention, it is to be understood that various changes and modifications may be made therein without departing from the spirit of the invention and the spirit and scope of the appended claims.

I claim as my invention:

1. An ignition device comprising a platform capable of occupying supporting and discharging positions with respect to an ignitable substance, means for urging the platform to discharging position, means for latching the platform in supporting position, and means defining a passageway operable to guide the ignitable substance when discharged from the platform into igniting relation to a fuse.

2. An ignition device comprising a tubular stake having an opening through which a fuse is adapted to be inserted into the stake, a platform normally occupying a supporting position within the stake, said stake having an opening through which a pellet formed of an ignitable substance can be deposited on said platform, and thermostatic means for controlling movement of the platform to a position in which the pellet is discharged downwardly into contact with said fuse for igniting the latter.

3. An igniting device comprising a tubular stake having a loading opening and a fuse receiving opening, a platform pivoted on the stake to occupy supporting and discharging positions with respect to a pellet introduced into the stake through said loading opening, means for yieldably urging the platform to discharging position, a latch for retaining the platform in supporting position, and a thermostat operable to move the latch to released position with respect to the platform whereby the latter is free to move to discharging position.

4. An ignition device comprising a platform mounted for movement to occupy supporting and discharging positions with respect to an ignitable substance, spring means directly engaging the platform for urging the platform to discharging position, a pivoted latch member normally engaging the platform to latch the latter in supporting position, thermo-responsive means engaging the latch lever for actuating the lever to release it from the platform only when a predetermined temperature of the atmosphere exists, and means adapted to support a fuse and defining a passage operable to guide the ignitable substance when discharged from the platform into igniting relation to the fuse.

5. An ignition device comprising a platform mounted for movement to occupy supporting and discharging positions with respect to an ignitable substance, spring means directly engaging the platform for urging the platform to discharging position, a pivoted latch member normally engaging the platform to latch the latter in supporting position, thermo-responsive means engaging the latch lever for actuating the lever to release it from the platform only when a predetermined temperature of the atmosphere exists, and a mounting for the aforementioned elements adapted to support a fuse and defining a passage operable to guide the ignitable substance when discharged from the platform into igniting relation to the fuse.

6. An igniting device comprising a tubular stake adapted to be driven into the ground and having a loading opening and a fuse receiving opening, a platform pivoted on the stake to occupy supporting and discharging positions with respect to a pellet introduced into the stake through said loading openings, a leaf spring secured to the stake and engaging the platform to normally urge the platform to discharging position, a latch lever pivoted on the stake and engaging the platform to retain the platform in supporting position, and a thermostat supported by the stake and engaging the latch lever to move the latter to released position with respect to the platform, whereby the latter is free to move to discharging position.

7. An ignition device comprising means mounted for movement to occupy supporting and discharging positions with respect to an ignitable substance, means for normally retaining the first means in its supporting position, means for actuating the last means to release the first means and allow the latter to move to discharging position, and means defining a passageway for guiding the ignitable substance when discharged from the first means into igniting relation to a fuse.

JOSEPH AMES ULMER.